United States Patent [19]

Evoy

[11] Patent Number: 5,628,029
[45] Date of Patent: May 6, 1997

[54] APPARATUS FOR MONITORING DISTRIBUTED I/O DEVICE BY PROVIDING A MONITOR IN EACH I/O DEVICE CONTROL FOR GENERATING SIGNALS BASED UPON THE DEVICE STATUS

[75] Inventor: David R. Evoy, Tempe, Ariz.

[73] Assignee: VLSI Technology, Inc., San Jose, Calif.

[21] Appl. No.: 383,385

[22] Filed: Feb. 3, 1995

[51] Int. Cl.⁶ ............................ G06F 11/30; G06F 13/00
[52] U.S. Cl. .................. 395/838; 395/180; 395/500; 395/726; 395/750; 395/835; 395/837; 364/550
[58] Field of Search ................. 395/182.1, 287, 395/550, 800, 883, 180, 500, 726, 750, 835, 837, 838, 775; 364/231, 514 B, 550

[56] References Cited

U.S. PATENT DOCUMENTS

| | | | |
|---|---|---|---|
| 4,459,656 | 7/1984 | Wilder, Jr. | 395/550 |
| 4,466,098 | 8/1984 | Southard | 395/182.1 |
| 5,175,853 | 12/1992 | Kardach et al. | 364/231 |
| 5,379,382 | 1/1995 | Work et al. | 395/883 |
| 5,392,441 | 2/1995 | Brasher et al. | 395/775 |
| 5,396,635 | 3/1995 | Fung | 395/800 |
| 5,432,947 | 7/1995 | Doi | 395/750 |
| 5,444,855 | 8/1995 | Thompson | 395/287 |

Primary Examiner—Thomas C. Lee
Assistant Examiner—Po C. Huang
Attorney, Agent, or Firm—Harry M. Weiss & Assoc.

[57] ABSTRACT

A distributed I/O device monitoring logic for power management control. The distributed I/O device monitoring logic reduces the gate count of convention device monitoring logic since the decode logic does not exist at two locations in the system. The distributed I/O device monitoring logic also has the benefits of self configuring monitor circuits, improved functionality, and decreased system power management overhead. The distributed I/O device monitoring logic comprises peripheral control for monitoring an I/O address range of at least one I/O device and for detecting access to the I/O device; system controller means coupled to the peripheral control for providing a ready (RDY #) signal and a system management interrupt (SMI #) signal; and central processing unit (CPU) coupled to the peripheral control and the system controller means for receiving the RDY # signal and the SMI # signal from the system controller and for sending information to both the system controller and the peripheral control.

16 Claims, 2 Drawing Sheets

APPARATUS FOR MONITORING DISTRIBUTED I/O DEVICE BY PROVIDING A MONITOR IN EACH I/O DEVICE CONTROL FOR GENERATING SIGNALS BASED UPON THE DEVICE STATUS

BACKGROUND OF THE INVENTION

1. Field of the Invention

This invention relates generally to monitoring logic for PC/AT notebook devices and methods therefor and, more specifically, to monitoring logic for PC/AT notebook devices and methods therefor which are distributed into individual I/O blocks thus reducing the amount of logic required for monitoring these devices.

2. Description of the Prior Art

Normally in a PC/AT notebook, devices are monitored by special logic that monitors the I/O addresses of the devices. The logic is programmed to match each I/O device's address range and to detect access to the I/O devices, which are generally peripherals. A strong trend exists in the industry to incorporate the peripherals for the portable notebooks into the system chip set. In fact, in most state of the art PC/AT portable systems, most of the common peripherals are located in the chip set. These devices generally include the printer, universal asynchronous receiver transmitters (UART (s)), floppy disk drives, real time clock (RTC), and possibly even the keyboard controller. However, incorporating these devices into the system chip set presents several problems.

In order to manage the I/O devices, the device monitoring logic in the system controller must be aware of the address of each I/O device it is monitoring. The device monitoring logic must also be aware of the state of each I/O device. This requires that the I/O decode logic in each I/O device must be duplicated in the device monitoring logic. Having the I/O decode logic at two locations presents several problems for the system. First, the device monitoring logic must have sufficient resources for a maximum configuration even if this requires much more logic than a typical configuration. Second, the I/O decode logic in the device monitoring logic of the system controller must match the configuration of each individual I/O device. Third, if the I/O device address is changed, the device monitoring logic must track the change since the system controller must be aware of the state of each I/O device.

Current conventional device monitoring logic also has another problem. Power management of individual I/O devices in a PC/AT portable system generally rely on programmable registers that can be configured to detect access to an I/O device's address range. The complexity of a programmable block of logic is substantially greater then the logic in a fixed I/O decode block. Many devices in a PC/AT portable system have configurable I/O addresses, generally a selection of 2 or 4 addresses. By distributing the I/O monitoring to the I/O block, this simple variable address selection is automatically extended to the I/O monitoring logic. Thus, the complex programmable logic would not be required.

Therefore, a need existed for managing PC/AT notebooks that would combine the individual circuits for I/O device select, I/O break and I/O activity detection into a single circuit. This in turn would simplify the logic required, simplify the programming of the logic, and allow for power management solutions that are targeted to a specific I/O devices's requirements. By distributing the monitoring logic to the individual I/O blocks, several benefits will result. Among these benefits are: a reduced gate count since the decode logic does not have to exist at two locations in the system, i.e. at the I/O device and at the device monitoring logic; self configuring monitor circuits since the same logic that is used to assign I/O addresses to the I/O devices would be used as an activity monitor circuit thereby saving the programming steps normally required to configure and reconfigure the monitor circuitry when an I/O device's address is changed; improved functionality since the I/O block being monitored is now power management aware thereby allowing the I/O block to modify its operation to conserve power; and decreased system power management overhead since the simple architecture requires fewer programming steps.

SUMMARY OF THE INVENTION

It is an object of the present invention to provide distributed I/O device monitoring logic and methods therefor.

It is a further object of the present invention to provide distributed I/O device monitoring logic and methods therefor that uses less logic, i.e. a reduced gate count, than the general purpose scheme.

It is still a further object of the present invention to provide distributed I/O device monitoring logic and methods therefor that uses the same logic to assign I/O addresses to the I/O device as an activity monitor circuit thereby saving the programming steps normally required to configure and reconfigure the monitor circuity when the I/O addresses are changed.

It is still a further object of the present invention to provide distributed I/O device monitoring logic and methods therefor that allows the I/O block being monitored to be power management aware thereby allowing the I/O block to modify its operation to conserve power.

It is still a further object of the present invention to provide distributed I/O device monitoring logic and methods therefor that decreases system power management overhead by requiring fewer programming steps.

BRIEF DESCRIPTION OF THE PREFERRED EMBODIMENTS

In accordance with one embodiment of the present invention a distributed input/output (I/O) device monitoring logic for power management control is disclosed. The distributed I/O device comprises peripheral control means for monitoring an I/O address range of at least one I/O device and for detecting access to the I/O device. System controller means are coupled to the peripheral control means for sending a ready (RDY #) signal and a system management interrupt (SMI #) signal to central processing unit (CPU) means. The CPU means is coupled to the peripheral control means and the system controller means for receiving the RDY # signal and the SMI # signal and for sending information to the system controller means and the peripheral control means.

In accordance with another embodiment of the present invention, a method for monitoring a PC/AT input/output (I/O) device is disclosed. The method comprises two modes of operation, a normal mode of operation and a disabled mode of operation. The normal mode of operation comprises the steps of: using I/O space to access normal PC/AT register functions; returning a ready (RDY #) signal to central processing unit (CPU) means when I/O device access is complete; and restarting activity timer in I/O monitoring means for the I/O device. The disabled mode of operation comprises the steps of: disabling access to I/O space for normal PC/AT register functions but allowing I/O space to access non-readable state information; asserting a system management interrupt (SMI #) signal; returning a RDY # signal to the CPU means; and performing an I/O break to the CPU.

In accordance with another embodiment of the present invention, a method of providing a distributed I/O device monitoring logic for power management control is disclosed. The method comprises the steps of: providing peripheral control means for monitoring an I/O address range of at least one I/O device and for detecting access to said I/O device; providing system controller means coupled to said peripheral control means for sending a ready (RDY #) signal and a system management interrupt (SMI #) signal to central processing unit (CPU) means; and providing CPU means coupled to said peripheral control means and said system controller means for receiving said RDY # signal and said SMI # signal and for sending information to said system controller means and said peripheral control means.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
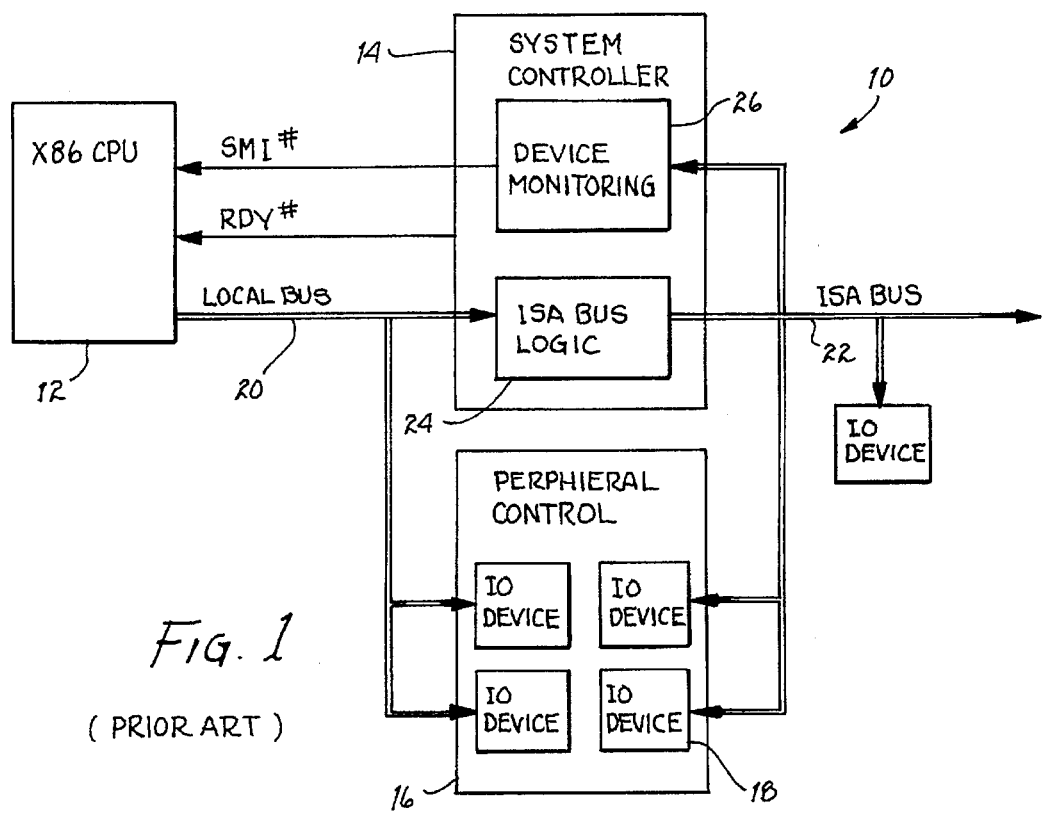
FIG. 1 shows a simplified block diagram of the conventional device monitoring logic for I/O devices.

Referring to FIG. 1, a conventional monitoring logic 10 is shown. The conventional device monitoring logic 10 comprises a central processing unit (CPU) 12, a system controller 14, and a peripheral control 16. The CPU 12 is coupled to the system controller 14 and the peripheral control 16 through a local bus 20. The system controller 14 is coupled to the peripheral control 16 through an industry standard architecture (ISA) bus 22 and the local bus 20.

A strong trend exist in the industry to incorporate the controls for input/output (I/O) devices (not shown) such as peripherals into the system chip set. As shown in FIG. 1, a plurality of I/O device control means 18 are incorporated into the peripheral control 16. Each of the I/O device control means 18 are coupled to the system controller 14 through either the local bus 20 or the ISA bus 22. The I/O device control means 18 which cannot be configured to fit on the local bus 20 are coupled to the system controller 14 through the ISA bus 22. The I/O device control means 18 which are compatible with the local bus 20 are coupled to the system controller 14 through the local bus 20.

The system controller 14 is comprised of ISA bus logic 24 and device monitoring logic 26. The ISA bus logic 24 is used to support peripheral devices (not shown). The device monitoring logic 26 of the system controller 14 must be aware of each I/O device that it is monitoring. The device monitoring logic must also be aware of the state (enabled/disabled) of each I/O device. As can be seen in FIG. 1, these requirements present several problems. First, not all of the I/O device control means 18 are coupled to the device monitoring logic 26. Only those I/O device control means 18 which can be configured to fit on the ISA bus 22 are coupled to the device monitoring logic 26. As such, not all of the I/O devices will be monitored. Second, since the device monitoring logic 26 must be aware of the address of each I/O device it is monitoring, as well as the state of each I/O device it is monitoring, the I/O decode logic in the I/O device control means 18 must be duplicated in the device monitoring logic 26 of the system controller 14. Placing the I/O decode logic at two locations places the following requirements on the system: 1) the device monitoring logic must have sufficient resources for a maximum configuration, even if this requires much more logic than a typical configuration; 2) the I/O decode logic in the device monitoring logic 26 must match the configuration of the individual I/O devices; and 3) if the I/O device address is changed, the monitoring logic must track the change.

Figure 2:
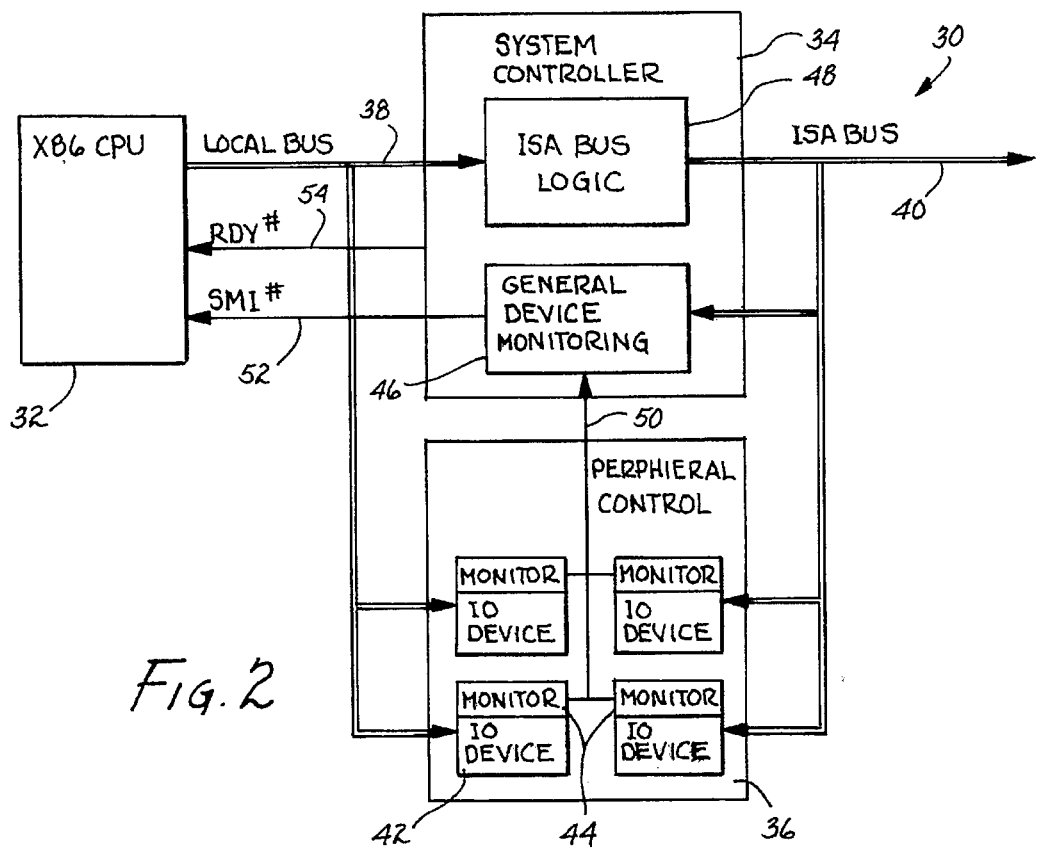
FIG. 2 shows a simplified block diagram of the distributed I/O device monitoring logic of the present invention.

Referring to FIG. 2, a distributed I/O device monitoring logic 30 of the present invention is shown. The distributed I/O device monitoring logic 30 is comprised of CPU means 32, system controller means 34, and peripheral control means 36. The CPU means 32 is coupled to the system controller means 34 and the peripheral control means 36 through a local bus 38. The system controller means 34 is coupled to the peripheral control means 36 through an ISA bus 40 and the local bus 38.

The peripheral control means 36 is comprised of a plurality of I/O device control means 42. Each I/O device control means 42 controls a different I/O device (not shown). The I/O device control means 42 are coupled to the system controller 34 through either the local bus 38 or the ISA bus 40. The I/O device control means 42 which cannot be configured to fit on the local bus 38 are coupled to the system controller 34 through the ISA bus 40. The I/O device control means 42 which are compatible with the local bus are coupled to the system controller 34 through the local bus 38.

To solve the problems of not being able to monitor all of the I/O devices and having I/O decode logic at two locations, the distributed I/O device monitoring logic 30 of the present invention couples each I/O device control means 42 to monitoring means 44. Each monitoring means 44 is able to monitor a particular I/O address range of an I/O device, detect access to the I/O device, and generate an SMI # signal when the system hardware requires service from the system management mode (SMM) program. Each of the monitoring means 44 must be able to generate an SMI # signal and send the signal through signal line 52 to the CPU means 32 prior to the system controller means 34 generating a RDY # signal through line 54.

The system controller means 34 is comprised of general device monitoring means 46. The general device monitoring means 46 is coupled to each monitoring means 44 through a signal line 50. Therefore, unlike prior art monitoring means, the general device monitoring means 46 is capable of monitoring access to each I/O device control means 42 incorporated into the peripheral control means 36. When one of the monitoring means 44 generates an SMI # signal, the general device monitoring means 46 receives the SMI # signal and sends the signal to the CPU 32 through the signal line 52.

The system controller means 34 is further comprised of ISA bus logic means 48. The ISA bus logic means 48 is coupled to the CPU 32 through the local bus 38. The ISA bus logic means 48 is also coupled to the general device monitoring means 46, and ISA compatible I/O device control means 42 through the ISA bus 40. The ISA bus logic means 48 is used to support peripheral devices that are plugged into the system.

The distributed I/O device monitoring logic 30 of the present invention allows for a new method of monitoring a PC/AT subsystem. The new method would have two modes of operation: a normal mode and a disabled mode. Under the normal mode of operation, I/O space is used to access the normal PC/AT register functions. When access to the I/O device is complete, a RDY # signal through line 54 is returned to the CPU 32. An activity timer (not shown) in monitoring means 44 of the I/O device control means 42 is then restarted. In the disabled mode, normal I/O access is disabled, although I/O space may be used to access non-readable state information while in system management mode. An SMI # signal is then asserted. A RDY # signal is returned through line 54 to the CPU means 32 causing an I/O break to be performed to the CPU means 12.

Figure 3:
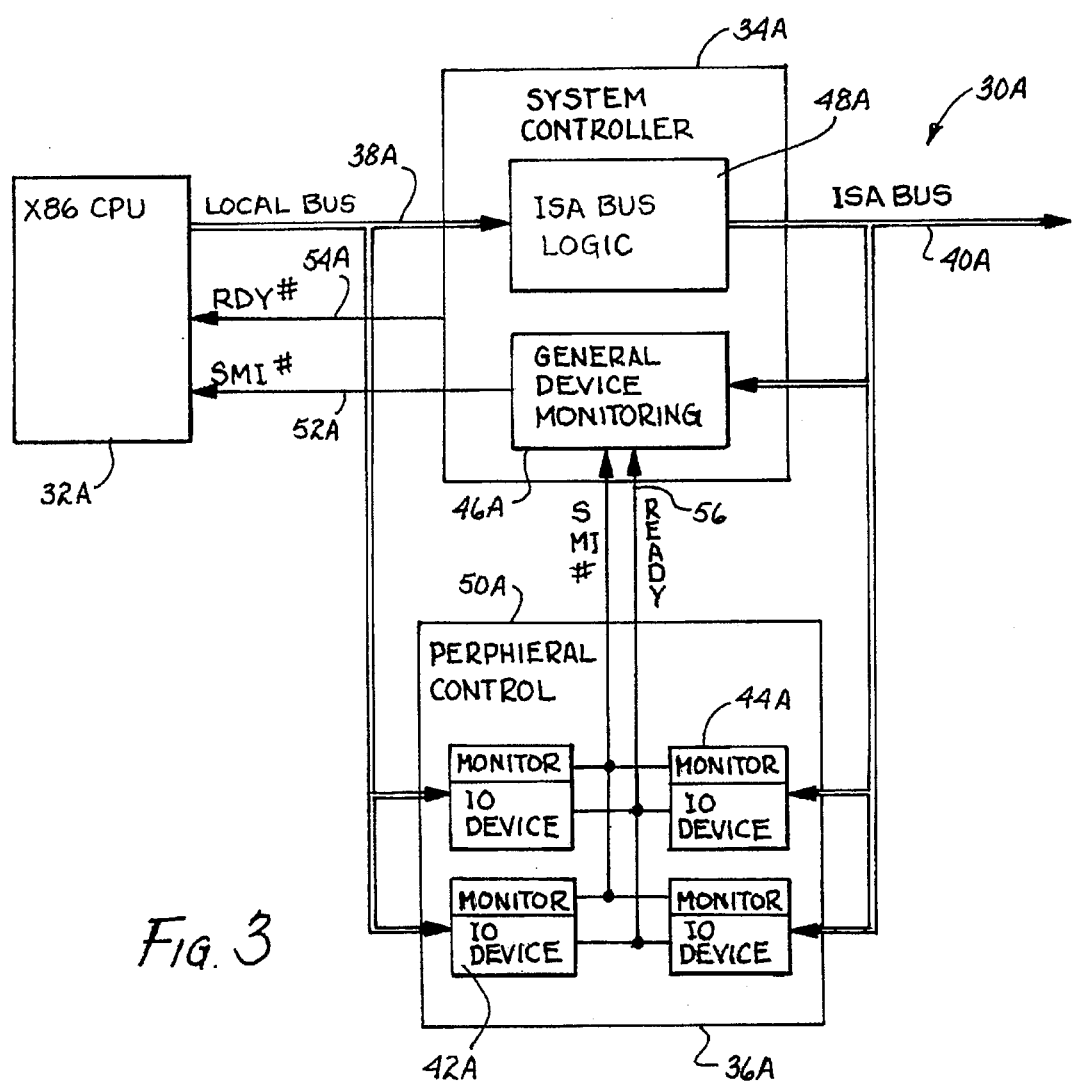
FIG. 3 shows a simplified block diagram of the distributed I/O device monitoring logic of FIG. 2 with performance enhancements.

Referring to FIG. 3, another embodiment of the present invention is shown wherein the same reference numerals are used as in FIG. 2 with the addition of the letter A to connotate a different embodiment. The distributed I/O device monitoring logic 30A is comprised of CPU means 32A, system controller means 34A, and peripheral control means 36A. The CPU means 32A is coupled to the system controller means 34A and the peripheral control means 36A through a local bus 38A. The system controller means 34A is coupled to the peripheral control means 36A through an ISA bus 40A and the local bus 38A.

The peripheral control means 36A is comprised of a plurality of I/O device control means 42A. Each I/O device control means 42A controls a different I/O device (not shown). The I/O device control means 42A are coupled to the system controller 34A through either the local bus 38A or the ISA bus 40A. Each I/O device control means 42A is coupled to monitoring means 44A. As with the previous embodiment, each monitoring means 44A is able to monitor a particular I/O address range of an I/O device, detect access to the I/O device, and generate an SMI # signal when the system hardware requires service from the system management mode (SMM) program. Each of the monitoring means 44A must be able to generate an SMI # signal through signal line 52A prior to the system controller means 34A generating a RDY # signal through line 54A.

The system controller means 34A is comprised of general device monitoring means 46A. The general device monitoring means 46A is coupled to each monitoring means 44A through a signal line 50A. As such, the general device monitoring means 46A is capable of monitoring access to each I/O device incorporated into the peripheral control means 36A. When one of the monitoring means 44A generates an SMI # signal, the general device monitoring means 46A receives the SMI # signal and sends the signal to the CPU 32A. The general device monitoring means 46A is also coupled to each I/O device control means 42A through an I/O ready line (IORDY) 56. The IORDY line optimizes each I/O device by altering the timing of each I/O device to allow more time to see if an SMI # signal has been generated. The IORDY line 56 works well with the distributed SMI # signal because the SMI # signal must be set prior to the RDY # signal being returned to the CPU 32A.

The system controller means 34 is further comprised of ISA bus logic means 48A. The ISA bus logic means 48A is coupled to the CPU 32A through the local bus 38A. The ISA bus logic means is also coupled to the general device monitoring means 46A, and ISA compatible I/O device control means 42A through the ISA bus 40A. The ISA bus logic means is used to support peripheral devices that are plugged into the system.

Many I/O devices in a PC/AT portable system have configurable I/O addresses, generally a selection of 2 or 4 addresses. Under the embodiments shown in FIGS. 2 and 3, the I/O monitoring is distributed to the I/O device control means 42 and 42A. The variable address selection is thereby automatically extended to the monitoring means 44 and 44A. Thus, complex programmable logic is not required at all.

It is also possible to use the address selection logic to access the state save information that has previously been saved in special purpose shadow resisters. In the embodiments shown in FIGS. 2 and 3, single bit means (not shown) could be coupled to each I/O device control means 42 and 42A to determine if the I/O device is enabled or disabled. When the I/O device is disabled, the I/O accesses are "block" by generating an SMI # signal. The data from this read or write operation is normally ignored and is redone when the device is reenabled. Since the data returned to the SMI handler (not shown) is normally discarded, supplemental data could be made available when the device is masked. This could include data that is normally available through shadow registers.

Some extensions for the use of the single bit means are as follows. If the single bit means determines that the I/O device is enabled, no SMI # signal is generated on a read or write operation to the I/O device. All I/O circuity and normal I/O registers are enabled. An internal timer (not shown), which monitors inactivity, generates an SMI # signal in the event of long periods of inactivity. The internal timer can now use I/O activity and local device indicators of activity like a ring indicator from a modem port (not shown) as I/O activity. If the single bit means determines that the I/O device is disabled, as stated above, the I/O accesses are "block" by generating an SMI # signal. All I/O pad circuitry is disabled. Power management registers, typically shadow registers, are accessed and all clocks are clamped off. Access to the normal I/O space is disabled for the I/O device. This allows the state to be frozen and not affected by the I/O read or write that is aborted during the SMI break.

While the present invention has been particularly shown and described with reference to preferred embodiments thereof, it will be understood by those skilled in the art that the foregoing and other changes in form and details may be made therein without departing from the spirit and scope of the invention.

I claim:

1. A distributed input/output (I/O) device monitoring logic system for power management control comprising, in combination:

peripheral control means for monitoring I/O address ranges of a plurality of I/O devices being controlled by said peripheral control means and for detecting access to any one of said plurality of I/O devices comprising:

a plurality of I/O device control means equal in number to said plurality of I/O devices wherein an individual one of said plurality of I/O device control means is coupled to an individual one of said plurality of I/O devices for controlling said individual one of said plurality of I/O devices; and a plurality of monitoring means equal in number to said plurality of I/O device control means wherein an individual one of said plurality of monitoring means is coupled to an individual one of said plurality of I/O device control means for monitoring an I/O address range of said individual one of said plurality of I/O devices, for generating I/O breaks when detecting access to said individual one of said plurality of I/O devices, for generating an SMI # signal after a period of inactivity to signal said system that said individual one of said plurality of I/O devices is not in use;

system controller means coupled to each of said plurality of monitoring means for monitoring activity of all of said plurality of I/O devices being controlled by said peripheral control means, for providing a ready (RDY #) signal when access to any one of said plurality of I/O devices is complete, and for transferring said SMI # signal sent from said peripheral control means; and central processing unit (CPU) means coupled to said peripheral control means and said system controller means for receiving said RDY # signal and said SMI # signal from said system controller means and for sending information to both said system controller means and said peripheral control means.

2. A distributed I/O device monitoring logic in accordance with claim 1 wherein said system controller means comprises:

general device monitoring means coupled to each of said plurality of monitoring means for monitoring all of said plurality of I/O devices being controlled by said peripheral control means, for receiving said SMI # signal generated by one of said plurality of I/O device control means and for sending said SMI # signal to said CPU means; and industry standard architecture (ISA) bus logic means coupled to said CPU means and said peripheral control means for receiving information from said CPU means and for supporting I/O devices including peripherals.

3. A distributed I/O device monitoring logic in accordance with claim 2 wherein said general device monitoring means is further coupled to said plurality of I/O device control means and having means for optimizing said plurality of I/O device control means by altering timing of said plurality I/O devices to allow additional time for an SMI # status to be determined.

4. A distributed I/O device monitoring logic in accordance with claim 1 further comprising single bit means coupled to each of said plurality of I/O device control means for determining if any of said plurality of I/O devices are enabled.

5. A distributed I/O device monitoring logic in accordance with claim 4 wherein said single bit means coupled to each of said plurality of I/O device control means is also used for determining if any of said plurality of I/O devices are disabled.

6. A distributed I/O device monitoring logic in accordance with claim 4 wherein said single bit means for determining if any of said plurality of I/O devices are enabled further comprises means for allowing an internal timer, which monitors inactivity, to generate said SMI # signal in the event of a long period of inactivity.

7. A distributed I/O device monitoring logic in accordance with claim 6 wherein said internal timer having means for using I/O activity and local device indicators of activity as a modem port.

8. A distributed I/O device monitoring logic in accordance with claim 5 wherein said single bit means for determining if any of said plurality of I/O devices are disabled further comprises means for allowing transfer of supplemental data by masking said plurality of I/O devices.

9. A method of providing a distributed input/output (I/O) device monitoring logic system for power management control comprising the steps of:

providing peripheral control means for monitoring I/O address ranges of a plurality of I/O devices being controlled by said peripheral control means and for detecting access to any one of said plurality of I/O devices comprising:

a plurality of I/O device control means equal in number to said plurality of I/O devices wherein an individual one of said plurality of I/O device control means is coupled to an individual one of said plurality of I/O devices for controlling said individual one of said plurality of I/O devices; and a plurality of monitoring means equal in number to said plurality of I/O device control means wherein an individual one of said plurality of monitoring means is coupled to an individual one of said plurality of I/O device control means for monitoring an I/O address range of said individual one of said plurality of I/O devices, for generating I/O breaks when detecting access to said individual one of said plurality of I/O devices, for generating an SMI # signal after a period of inactivity to signal said system that said individual one of said plurality of I/O devices is not in use;

providing system controller means coupled to each of said plurality of monitoring means for monitoring activity of all of said plurality of I/O devices being controlled by said peripheral control means, for providing a ready (RDY #) signal when access to any one of said plurality of I/O devices is complete, and for transferring said SMI # signal sent from said peripheral control means; and providing central processing unit (CPU) means coupled to said peripheral control means and said system controller means for receiving said RDY # signal and said SMI # signal from said system controller means and for sending information to both said system controller means and said peripheral control means.

10. The method claim 9 wherein said step of providing system controller means further comprises the steps of:

providing general device monitoring means coupled to each of said plurality of monitoring means for monitoring all of said plurality of I/O devices being controlled by said peripheral control means, for receiving said SMI # signal generated by one of said plurality of I/O device control means and for sending said SMI # signal to said CPU means; and providing industry standard architecture (ISA) bus logic means coupled to said CPU means and said peripheral control means for receiving information from said CPU means and for supporting I/O devices including peripherals.

11. The method of claim 10 wherein said step of providing general device monitoring means further comprises the step of coupling general device monitoring means to said plurality of I/O device control means and having means for optimizing said plurality of I/O device control means by altering timing of said plurality I/O devices to allow additional time for an SMI # status to be determined.

12. The method of claim 9 further comprising the step of providing single bit means coupled to each of said plurality of I/O device control means for determining if any of said plurality of I/O devices are enabled.

13. The method of claim 12 wherein said step of providing single bit means further comprises the step of providing single bit means coupled to each of said plurality of I/O device control means to determine if any of said plurality of I/O devices are disabled.

14. The method of claim 12 wherein said step of providing single bit means for determining if any of said plurality of I/O devices are enabled further comprises the step of providing means for allowing an internal timer, which monitors inactivity, to generate said SMI # signal in the event of a long period of inactivity.

15. The method of claim 14 wherein said step of providing means for allowing an internal timer further comprises the step of providing internal timer having means for using I/O activity and local device indicators of activity as a modem port.

16. The method of claim 13 wherein said step of providing single bit means for determining if any of said plurality of I/O devices are disabled further comprises the step of providing means for allowing transfer of supplemental data by masking said plurality of I/O devices.

* * * * *